United States Patent
Williams et al.

(10) Patent No.: US 11,540,101 B2
(45) Date of Patent: *Dec. 27, 2022

(54) METHODS AND SYSTEMS FOR DETERMINING ESIM PROFILE PRESENCE FOR REACTIVATION

(71) Applicant: Verizon Patent and Licensing Inc., Basking Ridge, NJ (US)

(72) Inventors: Mary Williams, Miltona, MN (US); Zhengfang Chen, Millburn, NJ (US); Axel Hallo de Wolf, Whippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/212,336

(22) Filed: Mar. 25, 2021

(65) Prior Publication Data

US 2021/0306830 A1    Sep. 30, 2021

Related U.S. Application Data

(63) Continuation of application No. 16/829,431, filed on Mar. 25, 2020, now Pat. No. 10,993,096.

(51) Int. Cl.
*H04W 4/50* (2018.01)
*H04W 8/24* (2009.01)

(52) U.S. Cl.
CPC .............. *H04W 4/50* (2018.02); *H04W 8/24* (2013.01)

(58) Field of Classification Search
CPC .......... H04W 4/50; H04W 8/24; H04W 8/205
See application file for complete search history.

(56) References Cited

U.S. PATENT DOCUMENTS

| | | | |
|---|---|---|---|
| 10,455,536 B1 | 10/2019 | Khawand et al. | |
| 10,993,096 B1* | 4/2021 | Williams | H04W 8/205 |
| 2011/0159843 A1* | 6/2011 | Heath | H04W 8/18 |
| | | | 455/418 |
| 2017/0289788 A1* | 10/2017 | Lalwaney | H04W 8/24 |
| 2019/0028884 A1 | 1/2019 | Namiranian | |
| 2019/0327610 A1 | 10/2019 | Rajadurai et al. | |

* cited by examiner

*Primary Examiner* — Marisol Figueroa

(57) ABSTRACT

A service provider may receive a user device that includes an embedded subscriber identity module (eSIM) associated with an equipment identifier (eID) with a previously provisioned service. The previously provisioned service may be provided by an eSIM profile (identified by an Integrated Circuit Card Identifier or ICCID) and the eSIM may contain more than one ICCID. The service provider may re-provision one of the existing ICCIDs to provide service based on the eID and historical data. The device and the carrier provisioning system may determine whether one of the profiles (ICCIDs) installed in the eSIM matches an already known eSIM profile (ICCD) and re-provision the eSIM profile (ICCD) for new wireless service. The service provider may then activate the user device for communication via the new wireless service in response to re-provisioning of the applicable eSIM profile (ICCID).

20 Claims, 5 Drawing Sheets

METHODS AND SYSTEMS FOR DETERMINING ESIM PROFILE PRESENCE FOR REACTIVATION

BACKGROUND INFORMATION

This patent application is a continuation of U.S. patent application Ser. No. 16/829,431, filed on Mar. 25, 2020, titled "Methods and Systems for Determining eSIM Profile Presence for Reactivation" the disclosure of which is incorporated by reference herein in its entirety.

BACKGROUND

Mobile devices with embedded subscriber identity modules (eSIM) have become more popular due to many advantages over traditional SIMs (non-eSIMs). While eSIM technology has brought many advantages, it has also introduced some disadvantages. In order to reactivate a device using eSIM technology, a new eSIM profile must be downloaded to the device. If a device has been reactivated numerous times, attempting to download a new eSIM profile to the eSIM may waste resources or may result in profile download failure due to lack of available memory on the eSIM.

DETAILED DESCRIPTION OF PREFERRED EMBODIMENTS

Figure 1:
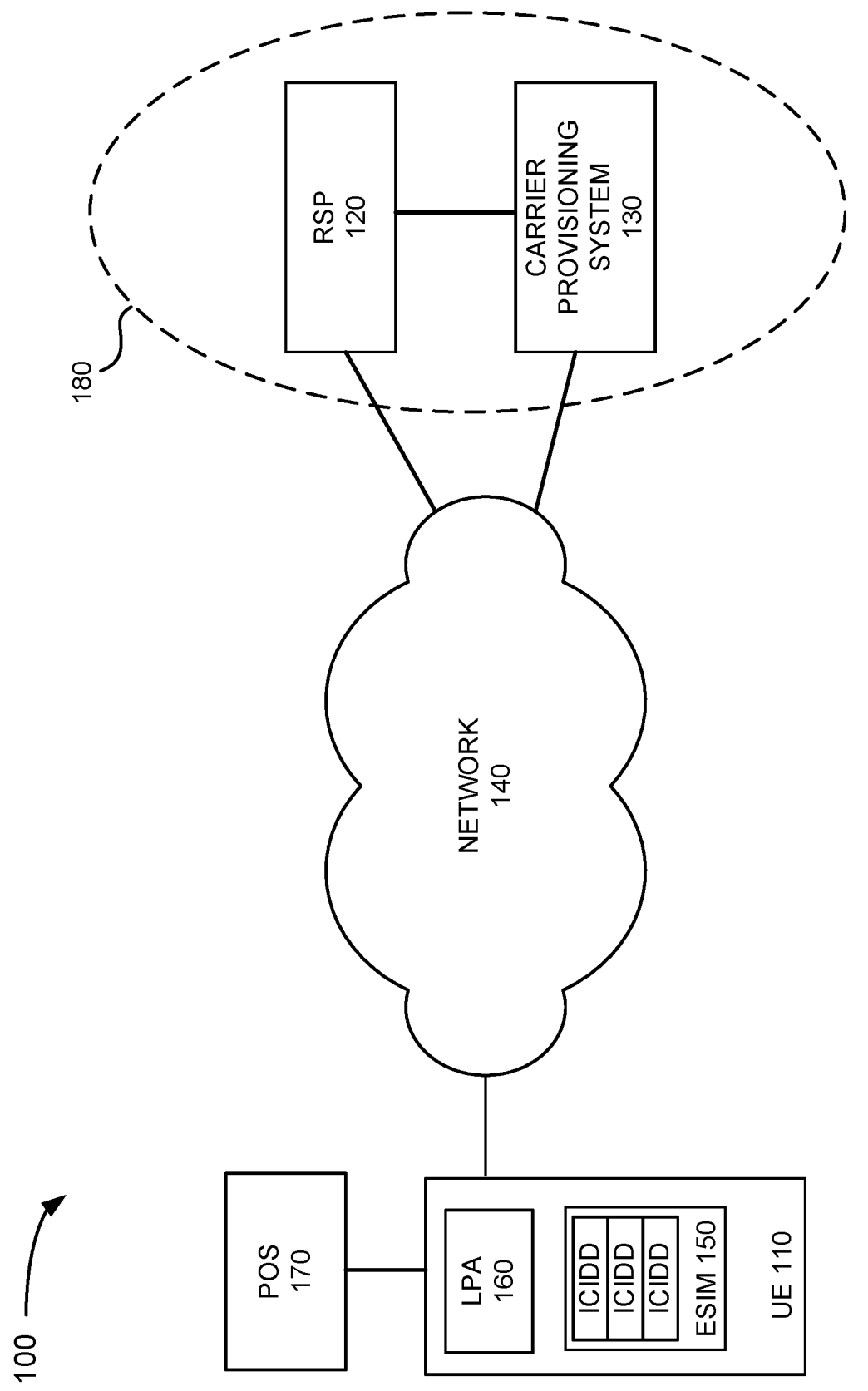
FIG. 1 is a diagram illustrating an exemplary environment in which systems and/or methods, described herein, may be implemented.

The following detailed description refers to the accompanying drawings. The same reference numbers in different drawings may identify the same or similar elements. Also, the following detailed description does not limit the invention.

Mobile devices with eSIMs have many advantages over mobile devices with traditional SIMS (non-eSIMs). For example, mobile devices with eSIMs may be more compact in size due to the lack of need for a SIM slot on the mobile device. In addition, mobile devices with eSIM technology may provide a flexibility of switching cellular network services among different service providers. Furthermore, eSIM technology may provide better customer experience because customers do not need to insert a physical SIM card into the mobile device or remove the physical SIM card from the mobile device when, for example, activating a device or changing service providers.

A disadvantage of eSIM technology may involve cellular service reactivation with a previously active eSIM device or cellular service activation with a previously inactive device. For example, a customer may switch cellular network providers and may need to reactivate an eSIM device that was previously activated on a different cellular network. As another example, a customer may purchase an eSIM device from an original equipment manufacturer (OEM) or from another source and may need to activate the eSIM device with a cellular network service provider.

In order to reactivate an eSIM device, a wireless network service provider may provision a network service using a new eSIM profile, which is downloaded to the eSIM device via a remote SIM provisioning (RSP) platform. A wireless network service provider, however, may not reactivate existing eSIM profiles because the wireless network service provider may not be aware of which eSIM profiles remain on an eSIM. For example, a customer may erase an eSIM profile locally and a wireless network service provider may not be aware that the erased eSIM profile no longer exists on the eSIM.

Due to the restricted storage allocated to eSIM, an eSIM may also be able to store only a limited number of eSIM profiles. Each time an eSIM device is reactivated, a new eSIM profile is downloaded to and stored on the eSIM. If an eSIM device is reactivated several times, the eSIM may become full. If the eSIM becomes full, a new eSIM profile may not be able to be downloaded to the eSIM when the eSIM device is being reactivated. A full eSIM may result in a reactivation failure for an eSIM mobile device.

Systems and methods described herein may detect eSIM profiles previously stored on an eSIM that may be re-provisioned for service. In this way, the overall profile inventory management and customer experience may be improved. For example, because new eSIM profiles may be used only after verification that old eSIM profiles are not available for re-provisioning, profile inventory management may be improved and the speed of reactivating a device may be increased.

In addition, implementations described herein may allow a service provider to determine if an eligible eSIM profile exists for reactivation on an eSIM with minimal user interaction. For example, a service provider may determine whether an eligible eSIM profile exists for reactivation without the installation of a service provider application on the eSIM device. In this way, an OEM may not be required to preload a carrier-specific application or a carrier-specific entitlement server address on the eSIM device. Additionally, a customer may not be required to download a carrier-specific application to the eSIM device to begin using the device. Therefore, implementations described herein may be scalable for multiple wireless network service providers. Additionally, if a service provider does not need to download a new eSIM profile it may save network bandwidth and other network resources.

FIG. 1 is a diagram of an exemplary environment 100 in which the systems and/or methods, described herein, may be implemented. As shown in FIG. 1, environment 100 may include user equipment (UE) device 110, a remote SIM Provisioning Platform (RSP) 120, a carrier provisioning system 130, a network 140, and a point-of-sale (POS) device 170. The elements shown within dotted area 180 (i.e., RSP 120 and carrier provisioning system (CPS) 130) may be associated with a wireless service provider that provides wireless services to UE 110. The elements shown within dotted area 180 may also be interconnected via an internal company network, such as a local area network or wide area network, that includes wired, wireless and/or optical connections between the elements illustrated in FIG. 1. In other implementations, the devices illustrated within dotted area 180 may be directly coupled or indirectly coupled to each other via an external network, such as the Internet.

UE 110 may include any device with long-range (e.g., cellular or mobile wireless network) wireless communication functionality. For example, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE 110 may include capabilities for voice communication, mobile broadband services (e.g., video streaming, real-time gaming, premium Internet access etc.), best effort data traffic, and/or other types of applications. UE 110 may also be referred to herein as a user device, a mobile device, or an eSIM device.

UE 110 may include an eSIM card 150 (also referred to herein as eSIM 150). eSIM 150 may be implemented as an embedded universal integrated circuit card (eUICC) that allows UE 110 to access a wireless network. eSIM 150 may be directly embedded into UE 110. eSIM 150 may store Integrated Circuit Card Identifiers (ICCIDs). ICCIDs may also be referred to as eSIM profiles or SIM profiles. An ICCID may store a user's subscription and network settings and allow the user to connect to the wireless network.

UE 110 may include a local profile assistant (LPA) 160. LPA 160 may include logic associated with interfacing with eSIM 150 to activate UE 110. LPA 160 may interface with RSP 120 to activate existing ICCIDs or download and activate a new ICCID to eSIM 150.

RSP 120 may include one or more computing devices or systems that provide for remote provisioning of ICCIDs to user devices 110. For example, RSP 120 may include a subscription manager-data preparation (SM-DP) device that acts as an eSIM subscription management server associated with a wireless carrier network. RSP 120 may act as an interface between LPA 160 on UE 110 and CPS 130 to re-provision an ICCID with a new service or download an ICCID to eSIM 150.

Carrier provisioning system 130 may include one or more computing devices or systems that act as a backend for a wireless network to facilitate operations of the wireless network. For example, carrier provisioning system 130 may include billing-related systems/databases, an electronic telephone number inventory (ETNI), a mobile terminating access service (MTAS), a home subscriber server (HSS), a unified data management (UDM) function, etc. Carrier provisioning system 130 may store historical records of eSIM profiles associated with UEs 110. Carrier provisioning system 130 may interact with RSP 120 to facilitate activation of UE 110, as described in detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. Network 140 provides wireless packet-switched services and wireless Internet protocol (IP) connectivity to UEs 110 to provide, for example, data, voice, and/or multimedia services.

POS device 170 (also referred to as POS 170) may include an interface for interacting with a customer for activating UE 110. In one implementation, POS 170 may be located at a store where the customer has purchased UE 110 and subscribed to cellular network service for UE 110. In another implementation, POS 170 may include an application associated with a wireless service provider or a website associated with the wireless service provider. POS 170 may display instructions for activating UE 110. In addition, POS 170 may display additional information needed to activate UE 110.

As used herein, the term "user" is intended to be broadly interpreted to include UE 110 and/or a person using UE 110. Also, the terms "user," "owner," "consumer," "subscriber," and/or "customer" are intended to be used interchangeably.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the components or networks may perform one or more functions described as being performed by another one or more of the other components or networks. The components and networks shown in FIG. 1 may interconnect via wired connections, wireless connections, or a combination of wired and wireless connections.

Figure 2:
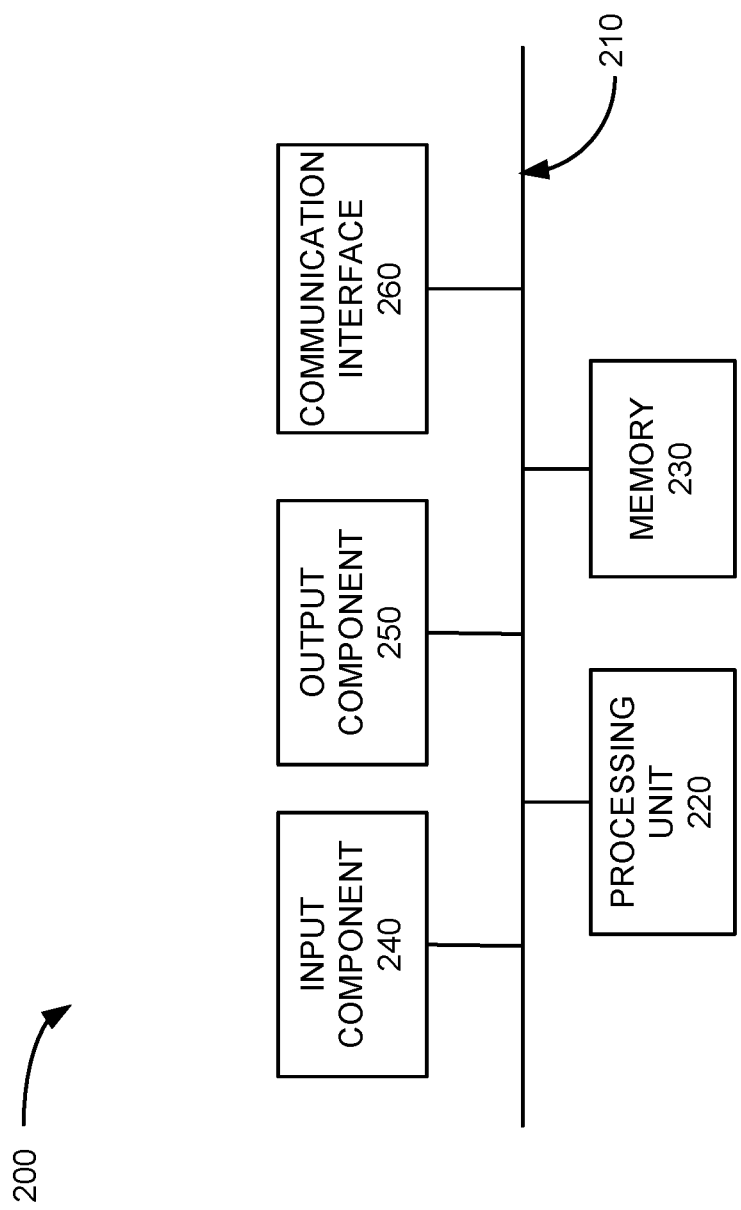
FIG. 2 is a diagram of exemplary components of a device that may be included in the environment shown in FIG. 1.

FIG. 2 is a diagram of exemplary components of a device 200 that may correspond to one of the components of UE 110, RSP 120, carrier provisioning system 130, POS 170, and/or network 140. As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, a microphone or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
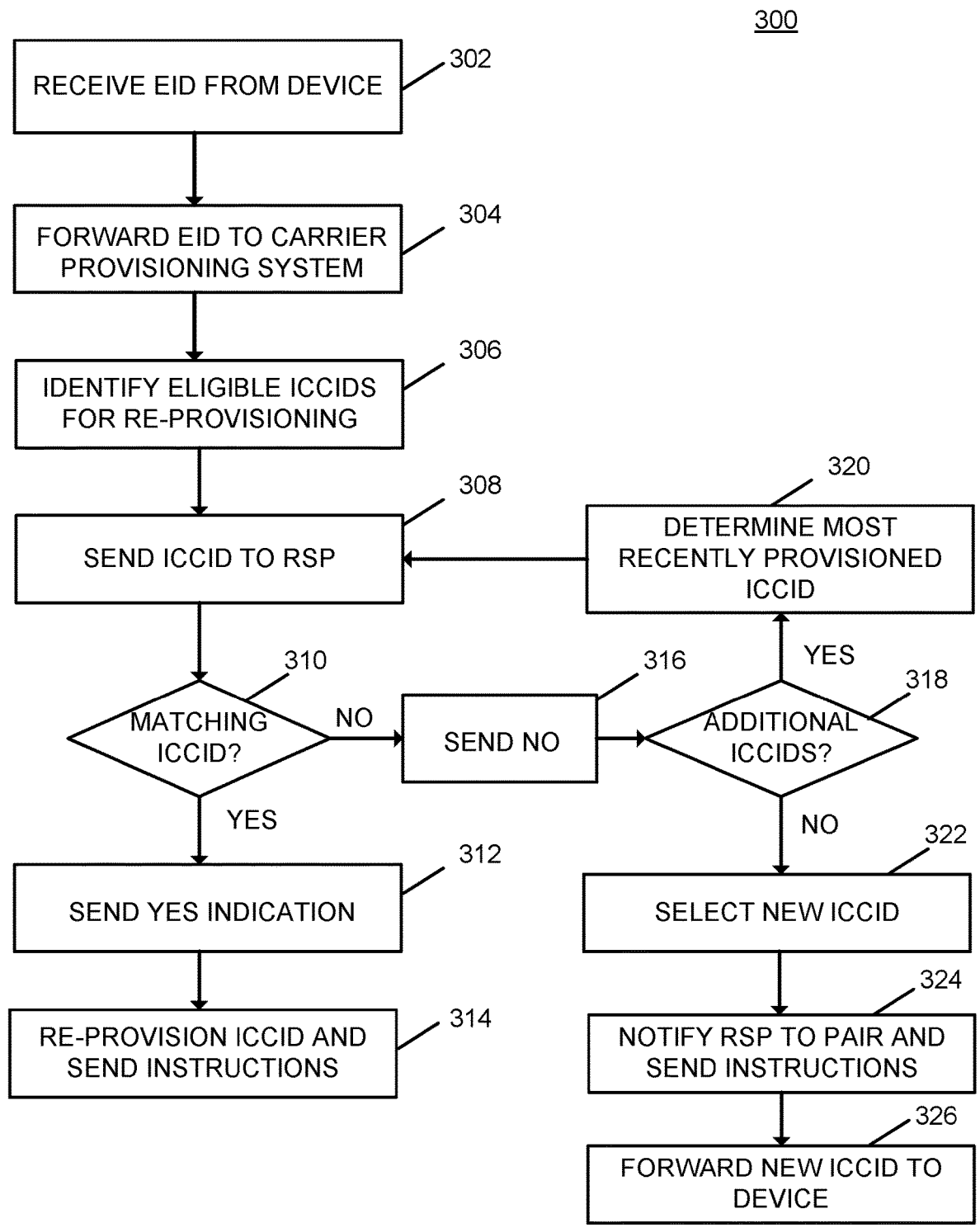
FIG. 3 is a flow chart of an exemplary process in which an eSIM profile may be provisioned.

FIG. 3 illustrates an exemplary method 300 for reactivating an eSIM device when an eligible eSIM profile exists. Method 300 may be performed by components of UE 110, RSP 120, and/or carrier provisioning system 130.

Method 300 may begin when RSP 120 receives an equipment identifier (eID) from UE 110 (block 302). A customer may sign up to access a wireless network service using UE 110 and may be prompted to check whether UE 110 is eligible to be enabled for the wireless network service. In one implementation, POS 170 may provide instructions to the customer for determining the eligibility of UE 110. For example, POS 170 may instruct the customer to check the device eligibility by accessing the "Settings" menu and choosing an "Add Service Provider" option via UE 110. In addition, POS 170 may present a Quick Response (QR) code and may provide instructions to the customer to scan the QR code. The QR code may contain a fully qualified domain name (FQDN) of RSP 120 via UE 110. When the QR code has been scanned, LPA 160 may send the eID associated with UE 110 to RSP 120.

Processing may continue with RSP 120 forwarding the eID of UE 110 to carrier provisioning system 130 (block 304). In one implementation, RSP 120 may additionally forward any notifications received for the eID (e.g., notifications indicating profile management actions, etc.) to carrier provisioning system 130. In response to receiving the eID of UE 110, carrier provisioning system 130 may locate any records of ICCIDs associated with eSIM 150 of UE 110 and may determine whether any ICCIDs are eligible for service re-provisioning (block 306). For example, carrier provisioning system 130 may locate historical records of all ICCIDs previously associated with eSIM 150 and may determine whether any of the ICCIDs have been removed or de-activated. In one implementation, carrier provisioning system 130 may determine whether any of the ICCIDs have been removed or de-activated by determining whether any Delete Notifications have previously been received by RSP 120 for any ICCIDs associated with the eSIM 150.

When an ICCID that is eligible for re-provisioning has been identified, carrier provisioning system 130 may send the ICCID to RSP 120 to determine whether eSIM 150 stores a matching ICCID (block 308). In one implementation, if more than one eligible ICCID has been identified, carrier provisioning system 130 may send the most recently assigned ICCID to RSP 120. For example, carrier provisioning system 130 may determine which ICCID has been most recently provisioned for use and may send the most recently provisioned ICCID to RSP 120. In response, RSP 120 may send a notification to LPA 160 to determine whether eSIM 150 stores a matching ICCID (block 310). In addition, RSP 130 may send LPA 160 a request for an enabled/disabled state associated with the ICCID if the matching ICCID is present on eSIM 150.

If a matching ICCID is installed on eSIM 150 (block 310—yes), UE 110 may send RSP 120 a "yes" indication that the matching ICCID is installed on eSIM 150 along with the enabled/disabled status of the ICCID and RSP 120 may send the "yes" indication and the enabled/disabled status to carrier provisioning system 130 (block 312). In response to receiving the indication that eSIM 150 stores the matching ICCID, carrier provisioning system 130 may re-provision the ICCID with a new service and may transmit instructions to the customer for activating the eSIM profile (block 314). In one implementation, carrier provisioning system 130 may transmit the activation instructions to POS 170 for the customer to view. For example, carrier provisioning system 130 may transmit instructions for enabling the ICCID if the ICCID is not enabled, such as instructions for performing a power cycle to enable to ICCID, etc. When the customer has completed/performed the actions corresponding to the instructions, UE 110 may be activated with cellular service.

If a matching ICCID is not stored on eSIM 150 (block 310—no), UE 110 may send RSP 120 a "no" indication that no matching ICCID is stored on eSIM 150 and RSP 120 may transmit the "no" indication to carrier provisioning system 130 (block 316). Carrier provisioning system 130 may determine whether additional ICCIDs are available for re-provisioning (block 318). For example, carrier provisioning system 130 may determine whether more than one eligible ICCID was identified in block 306. If additional ICCIDs are available for re-provisioning (block 318—yes), carrier provisioning system 130 may determine which ICCID of the additional ICCIDs has been most recently provisioned for use (block 320). When the most recently provisioned ICCID has been identified, carrier provisioning system 130 may send the ICCID to RSP 120 and on to LPA 160 to determine whether eSIM 150 stores a matching ICCID in the manner described above (blocks 308 and 310).

If carrier provisioning system 130 determines that no additional ICCIDs are available for re-provisioning (block 318—no), carrier provisioning system 130 may select a new ICCID for activation (block 322). For example, carrier provisioning system 130 may identify an ICCID that is not being used from the inventory and may provision the ICCID for activation.

When no additional ICCIDs are available for re-provisioning and carrier provisioning system 130 has selected a new ICCID for activation, carrier provisioning system 130 may notify RSP 120 to pair the new ICCID to the eID associated with eSIM 150 and may provide instructions for activating the service on UE 110 (block 324). For example, carrier provisioning system 130 may forward the new ICCID to RSP 120 with instructions to pair the new ICCID with the eID. In addition, carrier provisioning system 130 may provide instructions to the customer via POS 170 and/or UE 110 on the next steps to take to activate the service on UE 110. When the customer has followed the steps to activate UE 110, RSP 120 may receive a request from UE 110 for an eSIM profile and RSP 120 may forward the new eSIM profile with corresponding ICCID to UE 110 (block 326). In one implementation, LPA 160 may receive the new ICCID and may install the new eSIM profile on eSIM 150. When the eSIM profile is installed and enabled, cellular service may be activated on UE 110.

Figure 4:
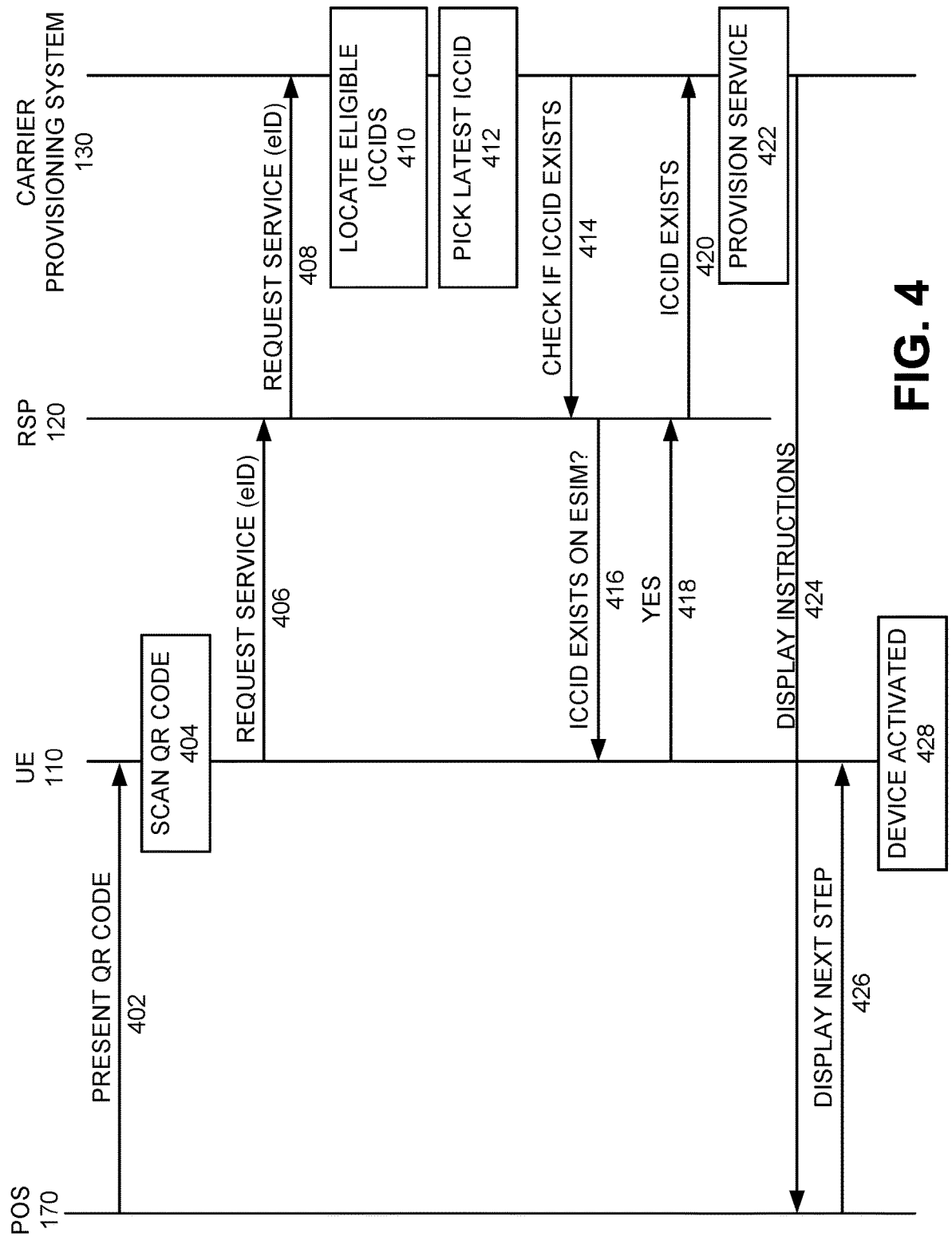
FIG. 4 is a diagram illustrating exemplary communications between devices to re-provision an existing eSIM profile.

FIG. 4 is a diagram illustrating exemplary communications between devices in network environment 100. Communications in FIG. 4 represent communications for re-provisioning an eSIM profile.

Referring to FIG. 4, when a customer wishes to activate UE 110, POS 170 may present a QR code that contains a FQDN of RSP 120 (402) and UE 110 may scan the QR code (404). In response to scanning the QR code, UE 110 may forward a message to RSP 120 that includes an eID associated with UE 110 and a request that service be activated for UE 110 (406). RSP 120 may forward the message to carrier provisioning system 130 (408).

After receiving the eID and the request, carrier provisioning device 130 may search for ICCIDs associated with the eID that are eligible for re-provisioning (410). For example, carrier provisioning device 130 may search historical records of ICCIDs associated with the eID and may determine if any ICCIDs exist that do not include "Delete Notifications" indicating that the ICCIDs have been deleted or de-activated. If carrier provisioning device 130 locates more than one ICCID that is ready for re-provisioning, carrier provisioning device 130 may identify the most recently provisioned ICCID (412).

When carrier provisioning system 130 identifies an ICCID or the most recently provisioned ICCID, carrier provisioning system 130 may forward the ICCID to RSP 120 with instructions to check whether a matching ICCID exists on eSIM 150 (414). RSP 120 may send a message to UE 110 inquiring whether the ICCID is stored on eSIM 150 (416). LPA 160 may determine that a matching ICCID is stored on eSIM 150 and may forward an indication to RSP 120 that the matching ICCID is stored on eSIM 150 (418). RSP 120 may forward the indication that the matching ICCID exists on eSIM 150 to carrier provisioning system 130 (420).

Although not shown in FIG. 4, if a matching ICCID is not stored on eSIM 150 and more than one eligible ICCID has been identified by carrier provisioning system 130, carrier provisioning system 130 may identify the next most recently provisioned ICCID and send instructions to RSP 120 to determine whether a matching ICCID is stored on eSIM 150. Carrier provisioning system 130 may continue to locate the next most recently provisioned ICCID associated with the eID until a matching ICCID is identified on eSIM 150. If no matching ICCIDs are stored on eSIM 150, the process may continue as discussed below with respect to FIG. 5.

When carrier provisioning system 130 receives the indication that the matching ICCID exists on eSIM 150, carrier provisioning system 130 may provision network service on the ICCID (422). In addition, carrier provisioning system 130 may send activation instructions to POS 170 (424). For example, carrier provisioning system 130 may send instructions to allow the customer to activate the eSIM profile in order to activate UE 110. In one implementation, carrier provisioning system 130 may send instructions to power cycle UE 110, enable the SIM profile if the eSIM profile is disabled, etc. POS 170 may display the instructions to activate the eSIM profile (426). After the customer has followed the instructions to activate the eSIM profile, UE 110 may be activated with a wireless network service (428).

Figure 5:
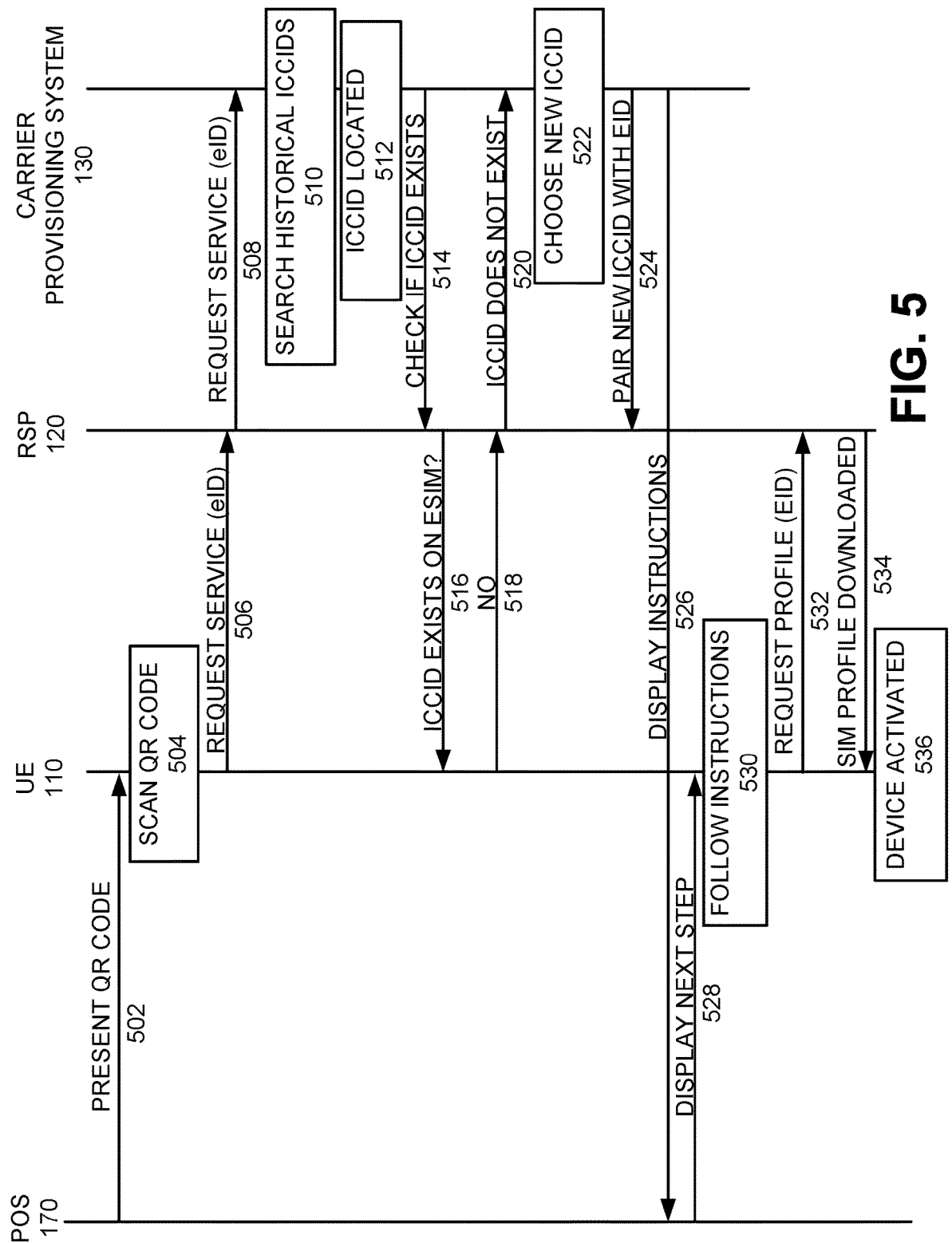
FIG. 5 is a diagram illustrating exemplary communications between devices to provision a new eSIM profile.

FIG. 5 is a diagram illustrating exemplary communications between devices in network environment 100. Communications in FIG. 5 represent communications for provisioning an eSIM profile when an eSIM is not available for re-provisioning.

Referring to FIG. 5, when a customer wishes to activate UE 110, POS 170 may present a QR code that contains a FQDN of RSP 120 (502) and UE 110 may scan the QR code (504). In response to scanning the QR code, UE 110 may forward a message to RSP 120 that includes an eID associated with UE 110 and a request that network service be activated for UE 110 (506). RSP 120 may forward the message to carrier provisioning system 130 (508).

After receiving the eID and the request, carrier provisioning device 130 may search historical ICCIDs associated with the eID (510) and may identify an ICCID that is ready for re-provisioning (512). When carrier provisioning system 130 identifies an ICCID to be re-provisioned, carrier provisioning system 130 may forward the ICCID to RSP 120 with instructions to check whether a matching ICCID exists on eSIM 150 (514). RSP 120 may send a message to UE 110 inquiring whether the ICCID is stored on eSIM 150 (516).

LPA 160 may determine that a matching ICCID is not stored on eSIM 150 and may forward an indication to RSP 120 that no matching ICCID is stored on eSIM 150 (518). RSP 120 may forward the indication that there is no matching ICCID on eSIM 150 to carrier provisioning system 130 (520) and carrier provisioning system 130 may determine a new ICCID for provisioning (522). For example, carrier provisioning system 130 may identify an ICCID that is not currently being used from an inventory of available ICCIDs.

Carrier provisioning system 130 may send instructions to RSP 120 to pair the new ICCID with the eID associated with UE 110 and to prepare to download the eSIM profile to UE 110 when UE 110 requests the eSIM profile (524). In addition, carrier provisioning system 130 may transmit instructions to POS 170 for activating the eSIM profile (526). For example, carrier provisioning system 130 may transmit instructions for the customer to follow to activate the eSIM profile on UE 110. In one implementation, the instructions may indicate that the customer should scan the QR code again in order to activate the eSIM profile. POS 170 may display the instructions for the customer to follow (528).

UE 110 may perform functions associated with activating the eSIM profile based on customer input (530) and may send the eID along with a request for the eSIM profile to RSP 120 (532). For example, the customer may follow the instructions displayed on POS 170 and, when the instructions are completed, UE 110 may send the eID and the request to RSP 120. UE 110 may then download the eSIM profile from RSP 120 (534). For example, LPA 160 may download the eSIM profile and install the eSIM profile on eSIM 150. When the eSIM profile is downloaded, the eSIM profile may be installed and enabled (536). At this point, the eSIM profile may be activated and UE 110 may be activated with the wireless network service.

If UE 110 was not previously activated with a carrier's service, UE 110 may be activated for the first time. In this case, carrier provisioning system 130 may have no historical activation record associated with eSIM 150 or UE 110. A new activation for UE 110 may follow the steps described above with respect to FIG. 5 in order to install the eSIM profile on eSIM 150 and activate UE 110 with the wireless network service. Therefore, the implementation described above may be used for a new eSIM device activation in addition to re-activation of an eSIM device when an eSIM is not available for re-provisioning.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 3, and a series of signal flows/messages have been described with respect to FIGS. 4 and 5, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, at one or more devices, an identifier associated with a user device, wherein the user device includes an embedded subscriber identity module (eSIM);
   identifying, by the one or more devices, a first eSIM profile associated with the identifier, wherein the first eSIM profile has been previously provisioned for a wireless service;
   re-provisioning, by the one or more devices, the first eSIM profile for a new wireless service when a second eSIM profile stored at the eSIM matches the first eSIM profile; and
   transmitting, by the one or more devices, instructions for activating the first eSIM profile for use with the new wireless service in response to re-provisioning the first eSIM profile.

2. The method of claim 1, further comprising:
   transmitting the first eSIM profile to a network device with instructions to determine whether the second eSIM profile stored on the user device matches the first eSIM profile;
   receiving, from the network device, an indication that the second eSIM profile matches the first eSIM profile; and
   re-provisioning the first eSIM profile in response to receiving the indication.

3. The method of claim 1, wherein identifying the first eSIM profile comprises:
   identifying the first eSIM profile as a most recently provisioned eSIM profile of a plurality of eSIM profiles.

4. The method of claim 3, further comprising:
   determining that the eSIM does not store a second eSIM profile that matches the first eSIM profile;
   identifying whether an additional eSIM profile, of the plurality of eSIM profiles, exists;
   re-provisioning the additional eSIM profile when the additional eSIM profile exists; and
   selecting a new eSIM profile for provisioning when the additional eSIM profile does not exist, wherein the new eSIM profile was not previously associated with the identifier.

5. The method of claim 1, further comprising:
   selecting a new eSIM profile for provisioning when the eSIM does not store a second eSIM profile that matches the first eSIM profile, wherein the new eSIM profile was not previously associated with the identifier.

6. The method of claim 5, further comprising:
   pairing the new eSIM profile with the user device; and
   transmitting instructions for activating the new wireless service on the user device.

7. The method of claim 1, wherein the instructions comprise instructions to power cycle the user device.

8. A device comprising:
   one or more processors configured to:

receive an identifier associated with a user device, wherein the user device includes an embedded subscriber identity module (eSIM);

identify a first eSIM profile associated with the identifier, wherein the first eSIM profile has been previously provisioned for a wireless service;

re-provision the first eSIM profile for a new wireless service when a second eSIM profile stored at the eSIM matches the first eSIM profile; and transmit instructions for activating the first eSIM profile for use with the new wireless service in response to re-provisioning the first eSIM profile.

9. The device of claim 8, wherein the one or more processors are further configured to:

transmit the first eSIM profile to a network device with instructions to determine whether the second eSIM profile stored on the user device matches the first eSIM profile;

receive, from the network device, an indication that the second eSIM profile matches the first eSIM profile; and re-provision the first eSIM profile in response to receiving the indication.

10. The device of claim 8, wherein, when identifying the first eSIM profile, the one or more processors are further configured to:

identify the first eSIM profile as a most recently provisioned eSIM profile of a plurality of eSIM profiles.

11. The device of claim 10, wherein the one or more processors are further configured to:

determine that the eSIM does not store a second eSIM profile that matches the first eSIM profile;

identify whether an additional eSIM profile, of the plurality of eSIM profiles, exists;

re-provision the additional eSIM profile when the additional eSIM profile exists; and select a new eSIM profile for provisioning when the additional eSIM profile does not exist, wherein the new eSIM profile was not previously associated with the identifier.

12. The device of claim 8, wherein the one or more processors are further configured to:

select a new eSIM profile for provisioning when the eSIM does not store a second eSIM profile that matches the first eSIM profile, wherein the new eSIM profile was not previously associated with the identifier.

13. The device of claim 12, wherein the one or more processors are further configured to:

pair the new eSIM profile with the user device; and transmit instructions for activating the new wireless service on the user device.

14. The device of claim 8, wherein the instructions comprise instructions to power cycle the user device.

15. A non-transitory computer-readable medium storing instructions executable by one or more processors, the instructions comprising:

one or instructions that, when executed by a processor, cause the processor to:

receive an identifier associated with a user device, wherein the user device includes an embedded subscriber identity module (eSIM);

identify a first eSIM profile associated with the identifier, wherein the first eSIM profile has been previously provisioned for a wireless service;

re-provision the first eSIM profile for a new wireless service when a second eSIM profile stored at the eSIM matches the first eSIM profile; and transmit instructions for activating the first eSIM profile for use with the new wireless service in response to re-provisioning the first eSIM profile.

16. The non-transitory computer-readable medium of claim 15, wherein the instructions further comprise one or more instructions that cause the one or more processors to:

transmit the first eSIM profile to a network device with instructions to determine whether the second eSIM profile stored on the user device matches the first eSIM profile;

receive, from the network device, an indication that the second eSIM profile matches the first eSIM profile; and re-provision the first eSIM profile in response to receiving the indication.

17. The non-transitory computer-readable medium of claim 15, wherein the instructions that cause the one or more processors to identify the first eSIM profile further comprise one or more instructions that cause the one or more processors to:

identify the first eSIM profile as a most recently provisioned eSIM profile of a plurality of eSIM profiles.

18. The non-transitory computer-readable medium of claim 17, wherein the instructions further comprise one or more instructions that cause the one or more processors to:

determine that the eSIM does not store a second eSIM profile that matches the first eSIM profile;

identify whether an additional eSIM profile, of the plurality of eSIM profiles, exists;

re-provision the additional eSIM profile when the additional eSIM profile exists; and select a new eSIM profile for provisioning when the additional eSIM profile does not exist, wherein the new eSIM profile was not previously associated with the identifier.

19. The non-transitory computer-readable medium of claim 15, wherein the instructions further comprise one or more instructions that cause the one or more processors to:

select a new eSIM profile for provisioning when the eSIM does not store a second eSIM profile that matches the first eSIM profile, wherein the new eSIM profile was not previously associated with the identifier.

20. The non-transitory computer-readable medium of claim 19, wherein the one or more instructions further comprise one or more instructions that cause the one or more processors to:

pair the new eSIM profile with the user device; and transmit instructions for activating the new wireless service on the user device.

\* \* \* \* \*